(12) United States Patent
Liu et al.

(10) Patent No.: US 12,619,952 B2
(45) Date of Patent: May 5, 2026

(54) METHOD AND SYSTEM FOR PROVIDING RECOMMENDATIONS FOR BILL OF MATERIALS REVISION

(71) Applicant: Siemens Aktiengesellschaft, Munich (DE)

(72) Inventors: Yushan Liu, Munich (DE); Anna Himmelhuber, Bayern (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 343 days.

(21) Appl. No.: 18/220,316

(22) Filed: Jul. 11, 2023

(65) Prior Publication Data

US 2024/0037504 A1 Feb. 1, 2024

(30) Foreign Application Priority Data

Jul. 27, 2022 (EP) .................................... 22187192

(51) Int. Cl.
*G06Q 10/0875* (2023.01)

(52) U.S. Cl.
CPC ................................ *G06Q 10/0875* (2013.01)

(58) Field of Classification Search
CPC .............. G06Q 10/0875; G06Q 10/04; G06F 16/9035; G06F 16/9038; G06F 18/23
See application file for complete search history.

(56) References Cited

U.S. PATENT DOCUMENTS

| | | | | |
|---|---|---|---|---|
| 2018/0260827 A1* | 9/2018 | Sullivan | ................. | G06N 3/084 |
| 2021/0081840 A1* | 3/2021 | Darmour | ................. | G06F 18/22 |
| 2022/0027849 A1* | 1/2022 | Beyer | ................. | G06F 18/2135 |

FOREIGN PATENT DOCUMENTS

CN 111625912 A 9/2020

OTHER PUBLICATIONS

Francesco Maiorana, A data mining approach for bill of materials for motor revision, 2012, Proceedings of the Federated Conference on Computer Science and Information Systems, pp. 1091-1096 (Year: 2012).*

(Continued)

*Primary Examiner* — Aaron Tutor
(74) *Attorney, Agent, or Firm* — Schmeiser, Olsen & Watts LLP

(57) ABSTRACT

For providing recommendations for bill of materials revision, a database is storing bills of materials for a set of products. A pattern learning module processes the stored bills of materials to learn patterns. Embodiments for learning structural and temporal patterns are provided. A pattern application module applies the patterns to a current bill of materials for a product of interest and forecasts recommendations, with each recommendation indicating how the current bill of materials should be updated. A user interface outputs the recommendations along with the applied patterns and their confidence values. The method and system provide an automized framework that forecasts revision for products. That framework helps to boost product quality by avoiding late recognition of change needs that would most likely negatively impact product and cost performance. Automatically assessing the change needs reduces hours spent by domain experts on these tasks, which saves internal costs.

7 Claims, 4 Drawing Sheets

(56)         References Cited

OTHER PUBLICATIONS

Yushan Liu, Yunpu Ma, Marcel Hildebrandt, Mitchell Joblin, Volker Tresp: "TLogic: Temporal Logical Rules for Explainable Link Forecasting on Temporal Knowledge Graphs", AAAI 2022; 2022.

Meilicke, Christian et al., "Anytime Bottom-Up Rule Learning for Knowledge Graph Completion"; in Proceedings of the Twenty-Eighth International Joint Conference on Artificial Intelligence (IJCAI-19); Germany; 2019.

Romanowski, et al: "On Comparing Bills of Materials: A Similarity/ Distance Measure For Unordered Trees (XP-002567702)"; published by IEEE Transactions on Systems, Man, And Cybernetics Part A: Systems And Humans. Institute of Electrical and Electronics Engineers Inc. vol. 35, No. 2, Mar. 2005 (pp. 249-260).

J.C. Hernández Matías, H. Pérez García, J. Pérez García, A. Vizán Idoipe: "Automatic generation of a bill of materials based on attribute patterns with variant specifications in a customer-oriented environment"; Journal of Materials Processing Technology; vol. 199, Issues 1-3, Apr. 1, 2008, pp. 431-436; 2008.

* cited by examiner

METHOD AND SYSTEM FOR PROVIDING RECOMMENDATIONS FOR BILL OF MATERIALS REVISION

CROSS-REFERENCE TO RELATED APPLICATIONS

This application claims priority to EP Application No. 22187192.4, having a filing date of Jul. 27, 2022, the entire contents of which are hereby incorporated by reference.

FIELD OF TECHNOLOGY

The following refers to changing/updating product-component structures over time. In the quality management domain, the product-component structure is called bill of materials (BoM), which includes all sub-assemblies and components needed to manufacture an end product.

BACKGROUND

It is hard to assess the suitability of the large mass of frequently introduced new components for certain products (e.g., resistors). Recognizing whether certain product structures have to be revised and how they have to be revised is a key need. Domain experts are responsible for making these changes/revisions in the product engineering domain.

An example of a bill of materials revision process is a desktop PC with subcomponent structure (hard drive, processor, main board, etc.) where the processor is replaced by a successor version. Improving this desktop PC (e.g., to increase its end-of-life date) is a manual revision task arranged by a domain expert. For different products, the bill of materials structure can also be very deep and/or very wide.

J. C. Hernández Matías, H. Pérez García, J. Pérez García, A. Vizán Idoipe: Automatic generation of a bill of materials based on attribute patterns with variant specifications in a customer-oriented environment, Journal of Materials Processing Technology, Volume 199, Issues 1-3, 1 Apr. 2008, Pages 431-436, disclose a method that automatically generates bill of materials.

SUMMARY

According to embodiments of the method for providing recommendations for bill of materials revision, the following operations are performed by modules, wherein the modules are hardware modules and/or software modules executed by one or more processors:

storing, in a database and for a set of products, bills of materials, wherein each bill of materials is represented by a hierarchical graph containing components and one of the products, and in particular, for each of the products several bills of materials are stored with different timestamps, processing, by a pattern learning module, the stored bills of materials to learn patterns, wherein at least some of the patterns are temporal patterns that are learned by for a number of iterations randomly sampling a sequence of subgraphs for one of the products from two bills of materials with subsequent timestamps, and calculating a confidence value, with the confidence value indicating a probability of the occurrence of the sequence of subgraphs in the bills of materials or in a subset of the bills of materials, wherein each temporal pattern contains a sequence of subgraphs and its confidence value, and/or wherein at least some of the patterns are structural patterns that are learned by for a number of iterations randomly sampling a subgraph from one of the bills of materials, and calculating a confidence value, with the confidence value indicating a probability of the occurrence of the subgraph in the bills of materials or in a subset of the bills of materials, wherein each structural pattern contains one of the subgraphs and its confidence value, forecasting, by a pattern application module applying the patterns to a current bill of materials for a product of interest, recommendations, with each recommendation indicating how the current bill of materials should be updated, in particular by adding a component to the current bill of materials or replacing a component in the current bill of materials, and outputting, by a user interface, the recommendations along with the applied patterns and their confidence values.

The system for providing recommendations for bill of materials revision comprises the following modules, wherein the modules are hardware modules and/or software modules executed by one or more processors:

a database, storing bills of materials for a set of products, wherein each bill of materials is represented by a hierarchical graph containing components and one of the products, and in particular, for each of the products several bills of materials are stored with different timestamps, a pattern learning module, configured for processing the stored bills of materials to learn patterns, wherein at least some of the patterns are temporal patterns that are learned by for a number of iterations randomly sampling a sequence of subgraphs for one of the products from two bills of materials with subsequent timestamps, and calculating a confidence value, with the confidence value indicating a probability of the occurrence of the sequence of subgraphs in the bills of materials or in a subset of the bills of materials, wherein each temporal pattern contains a sequence of subgraphs and its confidence value, and/or wherein at least some of the patterns are structural patterns that are learned by for a number of iterations randomly sampling a subgraph from one of the bills of materials, and calculating a confidence value, with the confidence value indicating a probability of the occurrence of the subgraph in the bills of materials or in a subset of the bills of materials, wherein each structural pattern contains one of the subgraphs and its confidence value, a pattern application module, configured for applying the patterns to a current bill of materials for a product of interest, and for forecasting recommendations, with each recommendation indicating how the current bill of materials should be updated, in particular by adding a component to the current bill of materials or replacing a component in the current bill of materials, and a user interface, configured for outputting the recommendations along with the applied patterns and their confidence values.

The following advantages and explanations are not necessarily the result of the object of the independent claims. Rather, they may be advantages and explanations that only apply to certain embodiments or variants.

In connection with embodiments of the invention, unless otherwise stated in the description, the terms "training", "generating", "computer-aided", "calculating", "determining", "reasoning", "retraining" and the like relate to actions and/or processes and/or processing steps that change and/or generate data and/or convert the data into other data, the data in particular being or being able to be represented as physical quantities, for example as electrical impulses.

The term "computer" should be interpreted as broadly as possible, in particular to cover all electronic devices with data processing properties. Computers can thus, for example, be personal computers, servers, clients, programmable logic controllers (PLCs), handheld computer systems, pocket PC devices, mobile radio devices, smartphones, devices or any other communication devices that can process data with computer support, processors and other electronic devices for data processing. Computers can in particular comprise one or more processors and memory units.

In connection with embodiments of the invention, a "memory", "memory unit" or "memory module" and the like can mean, for example, a volatile memory in the form of random-access memory (RAM) or a permanent memory such as a hard disk or a Disk.

The method and system, or at least some of their embodiments, provide an automized framework that forecasts revision for products.

The method and system, or at least some of their embodiments, help to avoid a late recognition of change needs that would most likely negatively impact product and cost performance. As a consequence, the method and system, or at least some of their embodiments, help to boost product quality.

Automatically assessing the change needs reduces hours spent by domain experts on these tasks, which saves internal costs.

The knowledge of domain experts is not easily shareable, and the expertise is limited to a few people in the company, which is lost when the domain expert leaves the company. Furthermore, domain experts are a limited resource and there might not be enough time or knowledge available to make necessary updates in a timely manner or at all. Furthermore, information can be missed by the domain expert and revisions can come too late. The method and system, or at least some of their embodiments, provide relief for these shortages.

Having an automized framework to enable adequate revisions saves costs through shorter time-to-market, lower maintenance costs and fewer working hours spent on the identification of change needs. The method and system, or at least some of their embodiments, help to overcome inefficacies in the revision process of products.

The method and system, or at least some of their embodiments, provide a bill of materials revision forecaster, which derives patterns from historical bill of materials data and applies them for forecasting.

The method and system, or at least some of their embodiments, provide an automized revision forecasting framework. Through the learning and application of temporal patterns, some of the embodiments leverage past information to make predictions for a similar product while utilizing product context component structure and additional information to identify similarities. The co-evolution of similar product structures can be revealed to domain experts while identifying change needs in time.

Furthermore, different bills of materials (different products e.g., a control panel for another application) can source the same sub-assemblies or components so that they can have shared parts giving indications about similarities between products.

In an embodiment of the method and system, patterns are discarded if their confidence value is below a threshold.

In an embodiment of the method and system, each product has a product type, and during each iteration, the confidence value is calculated by searching occurrences of the pattern in all other bills of materials for the same product type and dividing the number of occurrences by the total number of bills of materials for the same product type.

An embodiment of the method comprises the initial step of identifying, by a clustering algorithm, clusters of bills of materials. During each iteration, the confidence value is calculated by searching occurrences of the pattern in all other bills of materials in the same cluster and dividing the number of occurrences by the total number of bills of materials in the same cluster.

A computer program product (non-transitory computer readable storage medium having instructions, which when executed by a processor, perform actions) has program instructions for carrying out the method.

The provision device for the computer program product stores and/or provides the computer program product.

BRIEF DESCRIPTION

Some of the embodiments will be described in detail, with reference to the following figures, wherein like designations denote like members, wherein:

FIG. 5 shows a flowchart of a possible exemplary embodiment of a method for providing recommendations for bill of materials revision.

DETAILED DESCRIPTION

In the following description, various aspects of embodiments of the present invention and embodiments thereof will be described. However, it will be understood by those skilled in the conventional art that embodiments may be practiced with only some or all aspects thereof. For purposes of explanation, specific numbers and configurations are set forth in order to provide a thorough understanding. However, it will also be apparent to those skilled in the conventional art that the embodiments may be practiced without these specific details.

The described modules can each be hardware modules or software modules. For example, a software module can be a software library; an individual procedure, subroutine, or function; or, depending on the programming paradigm, any other portion of software code that implements the function of the software module. A combination of hardware modules and software modules can occur, in particular, if some of the effects according to embodiments of the invention are exclusively implemented by special hardware (e.g., a processor in the form of an ASIC or FPGA) and some other part by software.

Figure 1:
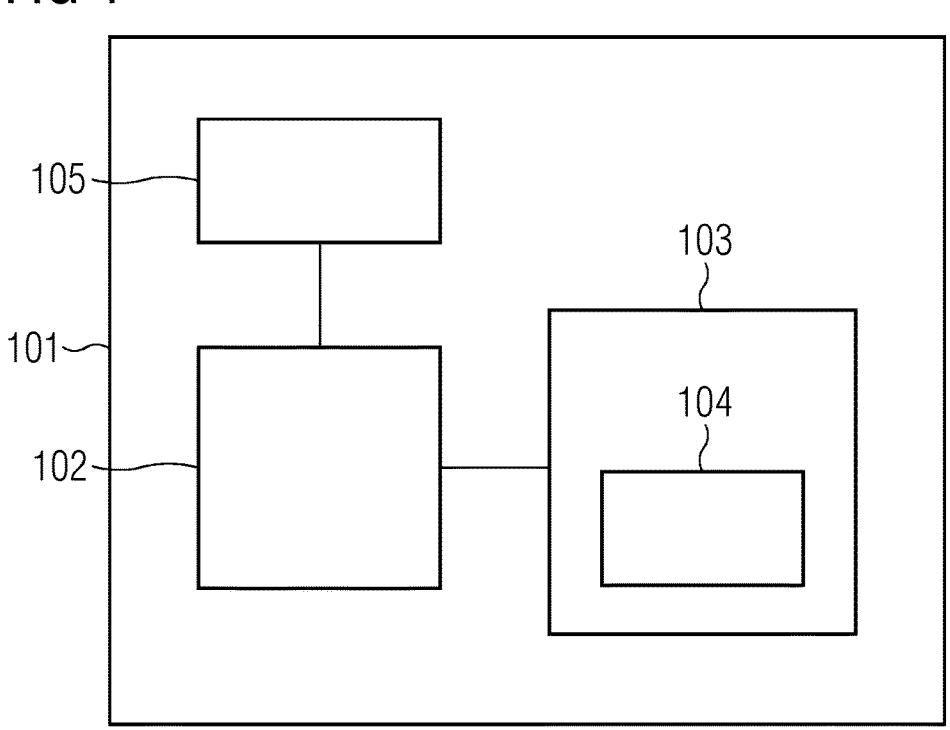
FIG. 1 shows a first embodiment.

FIG. 1 shows one sample structure for computer-implementation of embodiments of the invention which comprises:

- (101) computer system
- (102) processor
- (103) memory
- (104) computer program (product)
- (105) user interface In this embodiment of the invention the computer program 104 comprises program instructions for carrying out embodiments of the invention. The computer program 104 is stored in the memory 103 which renders, among others, the memory and/or its related computer system 101 a provisioning device for the computer program 104. The computer system 101 may carry out embodiments of the invention by executing the program instructions of the computer program 104 by the processor 102. Results of embodiments of the invention may be presented on the user interface 105. Alternatively, they may be stored in the memory 103 or on another suitable means for storing data.

Figure 2:
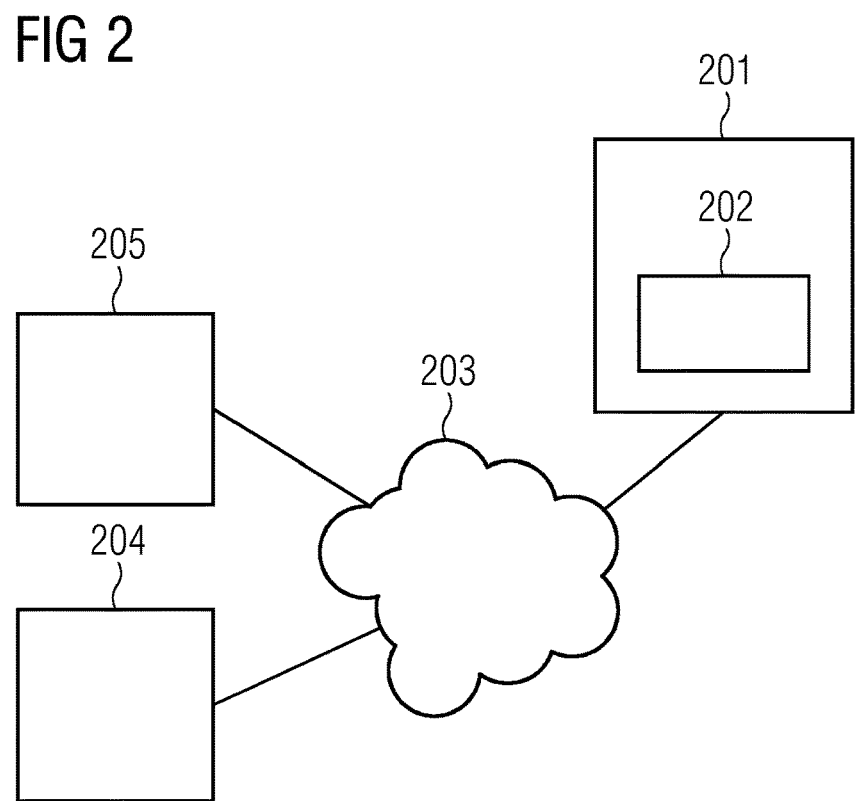
FIG. 2 shows another embodiment.

FIG. 2 shows another sample structure for computer-implementation of embodiments of the invention which comprises:

- (201) provisioning device
- (202) computer program (product)
- (203) computer network/Internet
- (204) computer system
- (205) mobile device/smartphone In this embodiment the provisioning device 201 stores a computer program 202 which comprises program instructions for carrying out the invention. The provisioning device 201 provides the computer program 202 via a computer network/Internet 203. By way of example, a computer system 204 or a mobile device/smartphone 205 may load the computer program 202 and carry out embodiments of the invention by executing the program instructions of the computer program 202.

In a variation of this embodiment, the provisioning device 201 is a computer-readable storage medium, for example a SD card, that stores the computer program 202 and is connected directly to the computer system 204 or the mobile device/smartphone 205 in order for it to load the computer program 202 and carry out embodiments of the invention by executing the program instructions of the computer program 202.

Figure 3:
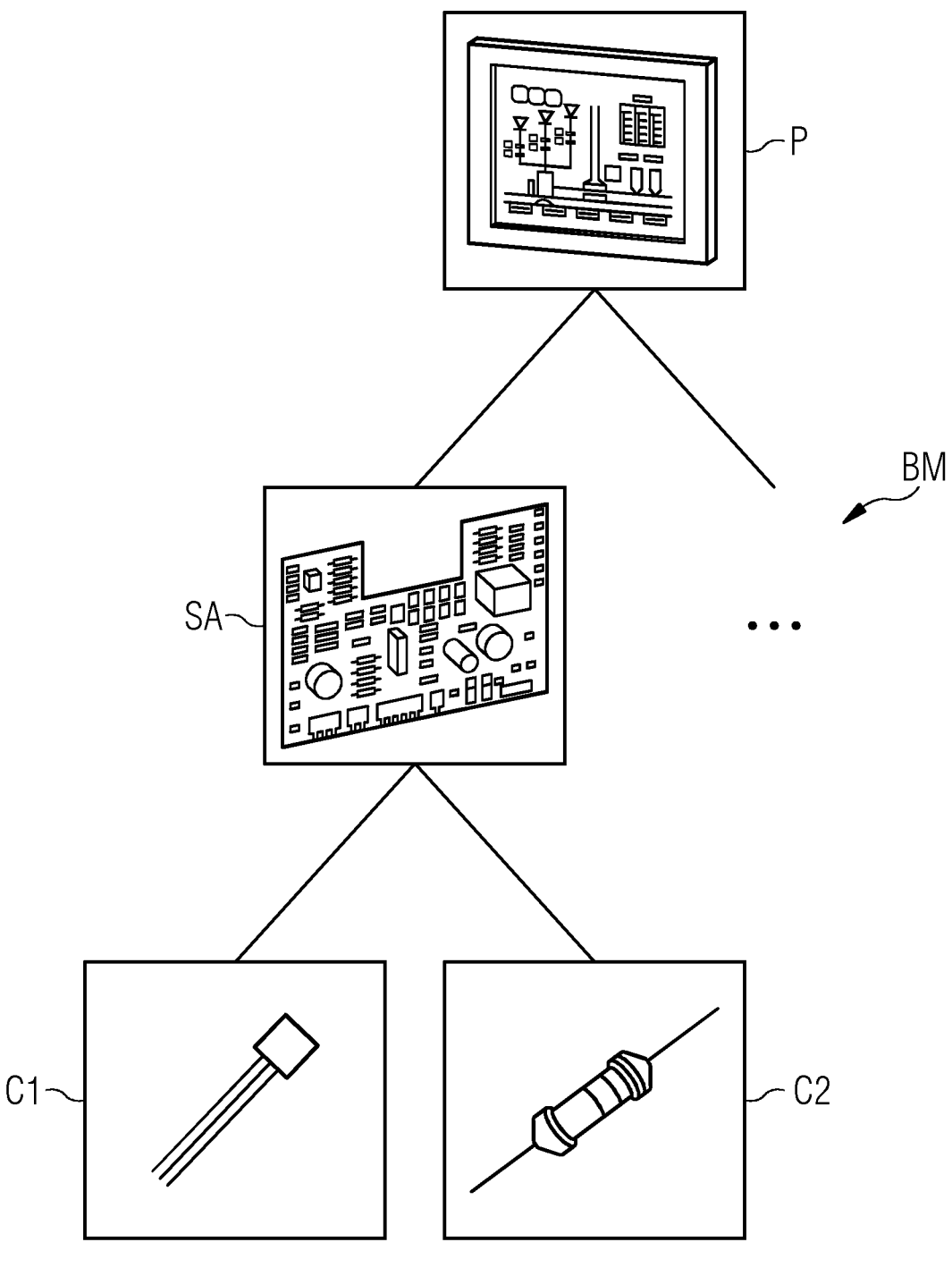
FIG. 3 shows a bill of materials BM.
Figure 4:
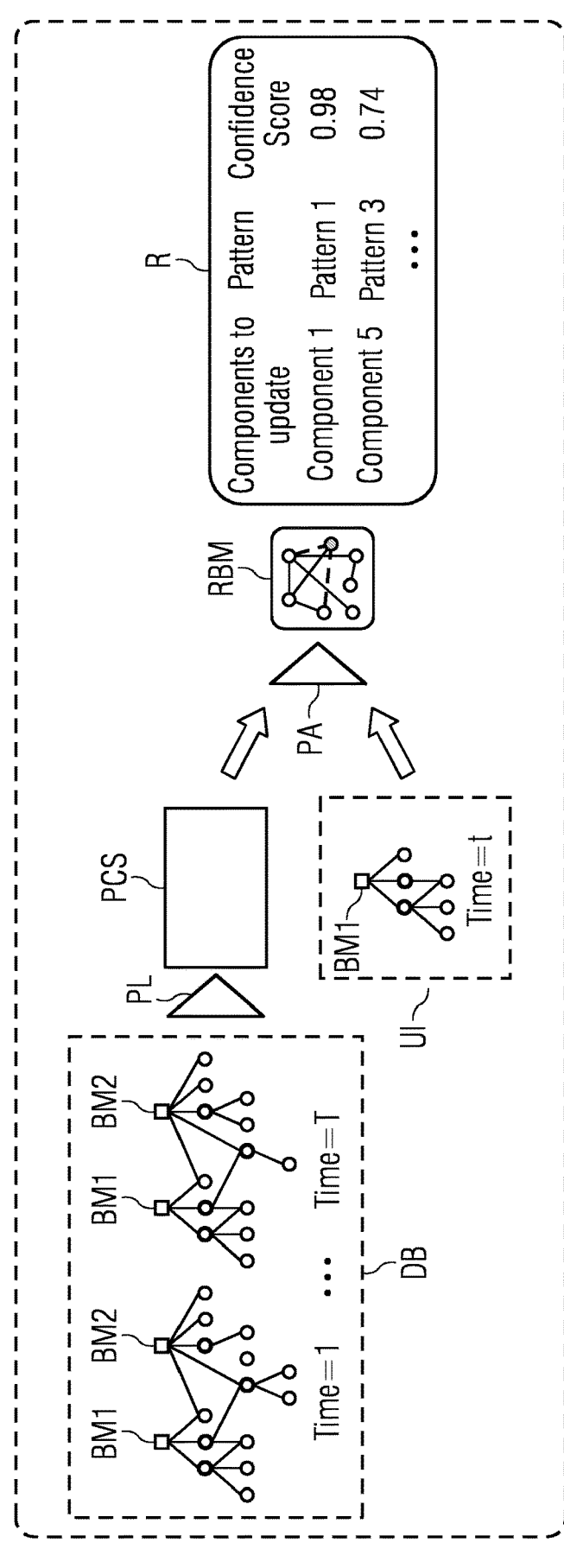
FIG. 4 shows an overall framework for providing recommendations for bill of materials revision.
Figure 5:
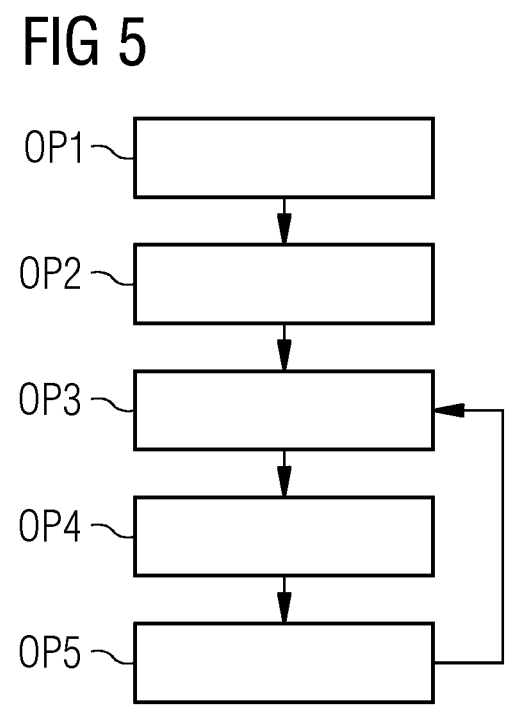

In an embodiment, FIGS. 3 to 5 can be implemented with a structure as shown in FIG. 1 or FIG. 2.

FIG. 3 shows a bill of materials BM for a product P, which is a control panel, in graph representation. Let the bill of materials BM of a product P be given in the form of a hierarchical graph (or tree) as shown in FIG. 3, where the top node represents the product P, the next level sub-assemblies SA, and the lowest level components C1, C2, where each node (except for the top node) is connected to a node in the upper hierarchy level according to the bill of materials BM.

For each product, the corresponding bill of materials is available for a discrete number of timestamps $\mathcal{T} = \{1, 2, \ldots, T\}$, where a timestamp could represent a day, month, etc. The bill of materials could evolve in the subsequent timestamp, e.g., including a newer version of a component, or stay unchanged if no changes have been made to the product structure. The idea of the following embodiments is to automatically find structural and/or temporal patterns in the bills of materials that can be applied to new or existing products and be used to forecast changes or possible improvements in the product structure.

Learning of Patterns

Let $\{p_1, p_2, \ldots, p_N\}$ be the set of products and $\{B_t^{p_i}\}_{t \in \mathcal{T}}$ the set of bills of materials of product $p_i$ for the timestamps $t \in \mathcal{T}$. The patterns are learned by randomly sampling a pattern that exists in a bill of materials and calculating the corresponding confidence value.

The process of sampling subgraphs (patterns) can be repeated for M times, yielding at most M unique patterns. After the learning step, the embodiment produces a list of patterns with their corresponding confidence values. To only consider relevant patterns, one could only keep the patterns with a minimum confidence.

Structural Patterns

A subgraph is sampled from a random bill of materials, e.g., the edge (CPU, HDD) is sampled from $$B_2^{computer},$$

stating that the product computer has a CPU with an HDD installed at timestamp 2. This subgraph (edge in the example) forms the learned structural pattern. To calculate a confidence value for this structural pattern, i.e., how likely this structural pattern exists for computers, the occurrences of this structural pattern are retrieved from all computer bills of materials (all bills of materials for a product with product type computer), and the number is divided by T, the total number of computer bills of materials. It would also be possible to calculate a confidence value over another subset of relevant bills of materials, where the bills of materials should have a similar structure as the product from which the structural pattern has been retrieved. For this, either domain knowledge about the similarity of products (product groups) could be used or a clustering algorithm could be applied to identify clusters of bills of materials.

Temporal Patterns

This embodiment defines a temporal pattern as a pattern that is retrieved from bills of materials from two subsequent timestamps, such as $$B_2^{computer}$$

and $$B_3^{computer}.$$

The retrieved sequence of subgraphs forms the temporal pattern. Similar to the learning of structural patterns, each temporal pattern is sampled from two consecutive bills of materials, e.g., the edge (CPU, HDD) from $$B_2^{computer}$$

and the edge (CPU, SSD) from $$B_3^{computer},$$

and the confidence value is calculated by retrieving the number of occurrences of the temporal pattern from all computer bills of materials or from another subset of all bills of materials.

Application of Patterns

The patterns are applied to a current bill of materials for a product of interest to predict changes in the product-component structure. The product of interest can either be new or already known, i.e., bills of materials from the product of interest were part of the learning step. The structural and/or temporal patterns are compared to the current bill of materials for the product of interest, and changes are recommended based on the patterns. For example, if almost all computers contain an HDD, an HDD will also be recommended for the new version of the computer. However, if the embodiment detects that an HDD is often replaced by an SSD at the subsequent timestamp, an SSD might be the better recommendation.

Eventually, the embodiment arrives at a list of recommendations for revising the current bill of materials for the product of interest, which could involve adding components, replacing parts, etc. The product of interest can be chosen from known products (bills of materials from the product of interest were part of the learning step) for further evolution of that product. Alternatively, a new but similar product of interest can be chosen, for example a laptop instead of a desktop computer. Domain knowledge could be integrated to identify product groups for pattern application.

Deployment Process

The algorithms for pattern learning and pattern application should be implemented in a tool with a graphical user interface. The product designer inputs the current bill of materials of a product into the tool and receives a list of recommendations along with the corresponding applied patterns with their confidences. The recommendations are ordered by decreasing confidence so that the recommendations with high confidences should be considered first. The designer can choose one recommendation, update the bill of materials, and repeat the process if necessary, at a later point in time.

The overall framework for providing recommendations for bill of materials revision shown in FIG. 4. A database DB is storing bills of materials BM1, BM2 for a set of products, wherein each bill of materials BM1, BM2 is represented by a hierarchical graph as shown in FIG. 3. For each of the products several bills of materials are stored with different timestamps Time=1 . . . Time=T. A pattern learning module PL is configured for processing the stored bills of materials to learn patterns PCS that also contain confidence values. A user interface UI receives a current bill of materials for a product of interest from a user. A pattern application module PA is configured for applying the patterns PCS to the current bill of materials for the product of interest, and for forecasting recommendations R, with each recommendation R indicating how the current bill of materials should be updated, in particular by adding a component to the current bill of materials or replacing a component in the current bill of materials. The user interface UI is configured for outputting the recommendations R along with the applied patterns and their confidence values. In addition, the user interface could visualize the recommended revisions to the current bill of materials with a recommended revised bill of materials RBM, which is a graph visualization.

Christian Meilicke, Melisachew Wudage Chekol, Daniel Ruffinelli, and Heiner Stuckenschmidt, Anytime Bottom-Up Rule Learning for Knowledge Graph Completion, IJCAI 2019, disclose the AnyBURL algorithm that can learn and apply rules on static knowledge graphs. The entire contents of that document are incorporated herein by reference.

The pattern learning module PL and the pattern application module PA can be implemented using the AnyBURL algorithm, wherein AnyBURL is applied to each bill of materials BM1, BM2 in the database DB separately to learn the patterns as rules within each bill of materials BM1, BM2. A category label (e.g., computer) can be assigned to each rule (pattern). Using the category label, the rules (patterns) can be filtered during application by the pattern application module PA, which can apply the rules (patterns) directly to a current bill of materials for a product of interest.

Yushan Liu, Yunpu Ma, Marcel Hildebrandt, Mitchell Joblin, and Volker Tresp, TLogic: Temporal Logical Rules for Explainable Link Forecasting on Temporal Knowledge Graphs, AAAI 2022, disclose the TLogic algorithm that can learn and apply rules on temporal knowledge graphs. The entire contents of that document are incorporated herein by reference.

In addition, or as an alternative to AnyBURL, the pattern learning module PL and the pattern application module PA can be implemented using the TLogic algorithm, which can be applied to sequences of bills of materials BM1, BM2 in the database DB to learn the patterns as rules. To facilitate the learning, several bills of materials BM1, BM2 with different timestamps in the database DB can be integrated into a single knowledge graph with added timestamps on the edges. A category label (e.g., computer) can be assigned to each rule (pattern). Using the category label, the rules (patterns) can be filtered during application by the pattern application module PA, which can apply the rules (patterns) directly to a current bill of materials for a product of interest.

FIG. 5 shows a flowchart of a possible exemplary embodiment of a method for providing recommendations for bill of materials revision. The flowchart shows the following operations that are performed by modules, and wherein the modules are software modules executed by one or more processors and/or hardware modules.

A storing operation OP1 stores bills of materials for a set of products in a database. Each bill of materials is represented by a hierarchical graph as shown in FIG. 3. For each of the products several bills of materials are stored with different timestamps.

In a processing operation OP2, a pattern learning module processes the stored bills of materials to learn patterns. At least some of the patterns are temporal patterns that are learned by for a number of iterations randomly sampling a sequence of subgraphs for one of the products from two bills of materials with subsequent timestamps, and calculating a confidence value, with the confidence value indicating a probability of the occurrence of the sequence of subgraphs in the bills of materials or in a subset of the bills of materials, wherein each temporal pattern contains a sequence of subgraphs and its confidence value.

In addition, or as an alternative, at least some of the patterns are structural patterns that are learned by for a number of iterations randomly sampling a subgraph from one of the bills of materials, and calculating a confidence value, with the confidence value indicating a probability of the occurrence of the subgraph in the bills of materials or in a subset of the bills of materials, wherein each structural pattern contains one of the subgraphs and its confidence value.

In a receiving operation OP3, a user interface receives a current bill of materials for a product of interest from a user.

In a forecasting operation OP4, a pattern application module applying the patterns to the current bill of materials is forecasting recommendations, with each recommendation indicating how the current bill of materials should be updated, in particular by adding a component to the current bill of materials or replacing a component in the current bill of materials.

In an outputting operation OP5, the user interface outputs the recommendations along with the applied patterns and their confidence values.

The workflow could then end or return to the receiving operation OP3, wherein a revised bill of materials is received that incorporates one or more revisions based on the recommendations. The revised bill of materials could then be used by the pattern application module to provide further recommendations.

For example, in embodiments, the method can be executed by one or more processors. Examples of processors include a microcontroller or a microprocessor, an Application Specific Integrated Circuit (ASIC), or a neuromorphic microchip, in particular a neuromorphic processor unit. The processor can be part of any kind of computer, including mobile computing devices such as tablet computers, smartphones or laptops, or part of a server in a control room or cloud.

The above-described method may be implemented via a computer program product including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for providing recommendations for a bill of materials revision, wherein the following operations are performed by modules, and wherein the modules are hardware modules and/or software modules executed by one or more processors:

storing, in a database and for a set of products, bills of materials, wherein:

each bill of materials is represented by a hierarchy containing components and one of the products, and for each of the products several bills of materials are stored with different timestamps, wherein the bills of materials with different timestamps are integrated into a temporal knowledge graph with timestamps added on edges of the hierarchical graphs, processing, by a pattern learning module, the stored bills of materials to learn patterns, wherein the pattern learning module implements a graph-based rule learning algorithm that processes the hierarchical graphs by traversing nodes and edges to extract subgraphs, wherein at least some of the patterns are temporal patterns that are learned by for a number of iterations:

randomly sampling a sequence of the subgraphs for one of the products from two bills of materials with subsequent timestamps, and calculating a confidence value indicating a probability of an occurrence of the sequence of the subgraphs in the bills of materials or in a subset of the bills of materials, wherein each temporal pattern contains the sequence of the subgraphs and the confidence value, and/or wherein at least some of the patterns are structural patterns that are learned by for a number of iterations:

randomly sampling a subgraph from one of the bills of materials, and calculating a confidence value indicating a probability of an occurrence of the subgraph in the bills of materials or in a subset of the bills of materials, wherein each structural pattern contains one of the subgraphs and the confidence value, forecasting, by a pattern application module applying the patterns to a current bill of materials for a product of interest, recommendations, with each recommendation indicating how the current bill of materials should be updated by adding a component to the current bill of materials or replacing a component in the current bill of materials, and outputting, by a user interface, the recommendations along with the applied patterns and confidence values.

2. The method of claim 1, wherein patterns are discarded if the confidence value is below a threshold.

3. The method according to claim 1, wherein:

each product has a product type, and during each iteration, the confidence value is calculated by:

searching occurrences of the pattern in all other bills of materials for a same product type, and dividing the number of occurrences by a total number of bills of materials for the same product type.

4. The method according to claim 1, further comprising:

identifying, by a clustering algorithm, clusters of bills of materials, wherein during each iteration, the confidence value is calculated by:

searching occurrences of the pattern in all other bills of materials in the same cluster, and dividing the number of occurrences by the total number of bills of materials in the same cluster.

5. A system for providing recommendations for a bill of materials revision, comprising:

one or more processors;

a memory coupled to the one or more processors;

a database storing bills of materials for a set of products, wherein:

each bill of materials is represented by a hierarchy containing components and one of the products, and for each of the products several bills of materials are stored with different timestamps, wherein the bills of materials with different timestamps are integrated into a temporal knowledge graph with timestamps added on edges of the hierarchical graphs, wherein the one or more processors are configured to:

process the stored bills of materials to learn patterns, and to implement a graph-based rule learning algorithm that processes the hierarchical graphs by traversing nodes and edges to extract subgraphs, wherein at least some of the patterns are temporal patterns that are learned by for a number of iterations:

randomly sampling a sequence of the subgraphs for one of the products from two bills of materials with subsequent timestamps, and calculating a confidence value indicating a probability of an occurrence of the sequence of the subgraphs in the bills of materials or in a subset of the bills of materials, wherein each temporal pattern contains the sequence of the subgraphs and the confidence value, and/or wherein at least some of the patterns are structural patterns that are learned by for a number of iterations:

randomly sampling a subgraph from one of the bills of materials, and calculating a confidence value indicating a probability of an occurrence of the subgraph in the bills of materials or in a subset of the bills of materials, wherein each structural pattern contains one of the subgraphs and the confidence value, apply the patterns to a current bill of materials for a product of interest, recommendations, with each recommendation indicating how the current bill of materials should be updated by adding a component to the current bill of materials or replacing a component in the current bill of materials, and output the recommendations along with the applied patterns and confidence values.

6. A computer program product, comprising a computer readable hardware storage device having computer readable program code stored therein, said program code executable by a processor of a computer system to implement a method according to claim 1.

7. A provision device for the computer program product according to claim 6, wherein the provision device stores and/or provides the computer program product.

* * * * *